United States Patent

[11] 3,622,490

| [72] | Inventor | Michael James Lockett<br>Goostrey, Holmes Chapel, England |
|---|---|---|
| [21] | Appl. No. | 808,789 |
| [22] | Filed | Mar. 20, 1969 |
| [45] | Patented | Nov. 23, 1971 |
| [73] | Assignee | Murgatroyd's Salt and Chemical Company Limited<br>Elworth, Sandbach, England |
| [32] | Priority | Mar. 29, 1968 |
| [33] | | Great Britain |
| [31] | | 15,347/68 |

[54] ELECTRICAL CIRCUIT
3 Claims, 1 Drawing Fig.

[52] U.S. Cl. .................................................. 204/220,
 136/86, 204/DIG. 4, 204/228
[51] Int. Cl. ...................................................... C22d 1/04,
 B01k 3/00
[50] Field of Search .......................................... 204/99,
 100, 219, 220, 250, 228, 1.06; 136/86

[56] References Cited
UNITED STATES PATENTS

| 3,068,157 | 12/1962 | Vielstich et al. | 204/228 X |
| 3,421,994 | 1/1969 | Le Duc | 204/219 |
| 2,970,095 | 1/1961 | Kandler et al. | 204/250 X |

*Primary Examiner*—John H. Mack
*Assistant Examiner*—D. R. Valentine
*Attorney*—Jacobs & Jacobs

ABSTRACT: The invention is an electrical circuit comprising a source of DC power, a plurality of electrolytic cells in which mercury is used as the cathode, and a plurality of fuel cells. The electrolytic cells and fuel cells are connected alternately and electrically in series and a shunt is provided from the cathode of each of the electrolytic cells to the anode of the next but one electrolytic cell. Amalgam produced in the electrolytic cells is used as fuel in the fuel cells to reduce total energy requirements.

PATENTED NOV 23 1971
3,622,490
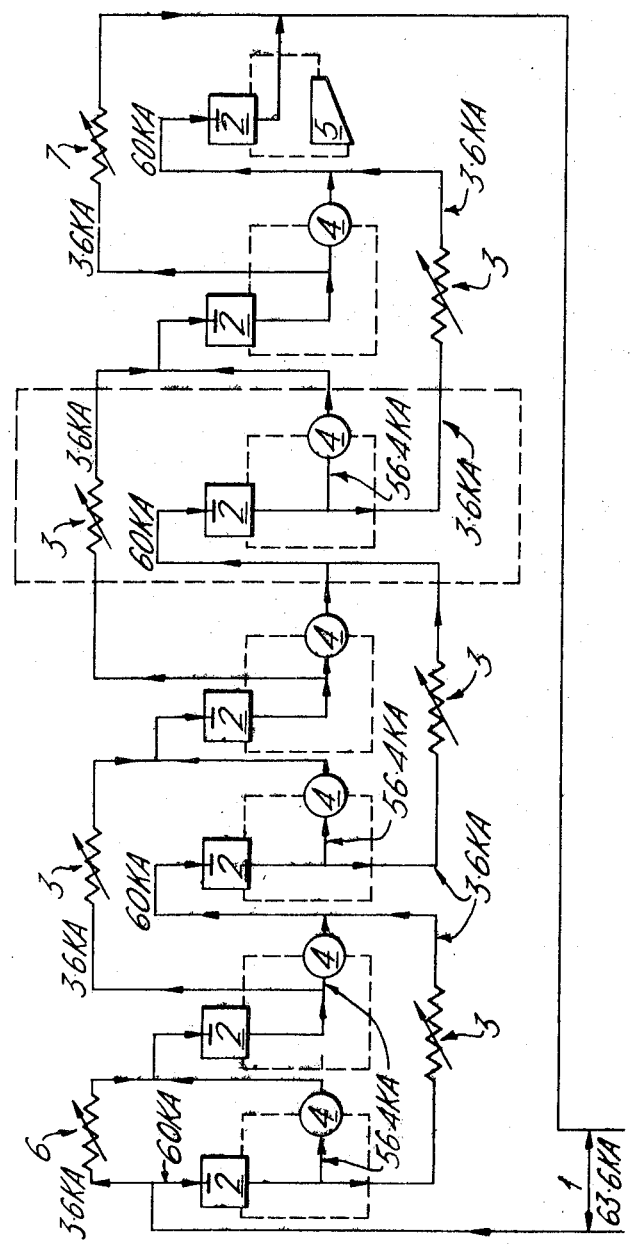
INVENTOR
MICHAEL JAMES LOCKETT
By Jacobs & Jacobs

ELECTRICAL CIRCUIT

The present invention relates to an electric circuit which permits the recovery by means of fuel cells of some of the energy which is expended in electrolytic cells.

It is known to electrolyze solutions of alkali metal halides such as sodium or potassium chloride in a cell having graphite anodes and a mercury cathode. During the course of the electrolysis, alkali metal atoms become dissolved in the mercury to form an alkali metal mercury amalgam. This amalgam is removed from the cell and decomposed with water to give alkali metal hydroxide solution and mercury, which is returned to the cell.

It has now been proposed to use the amalgam as fuel in a fuel cell, suitably in conjunction with air or oxygen depolarized cathodes. The fuel cell is used as a source of part of the energy for the electrolysis.

The electrolytic cell does not operate with 100 percent current efficiency i.e. the amount of alkali metal discharged at the cathode is not exactly that predicted by a simple application of Faraday's laws, owing to more than one reaction occuring, species recombining, and the like. This means that the number of coulombs which can be obtained from the amalgam fuel will be less than are required to produce the amalgam even if the fuel cell is 100 percent efficient. Hence the fuel cell cannot simply be connected electrically in series with the electrolytic cell circuit.

The present invention is a circuit for use in the electrolysis of solutions of alkali metal halides which comprises a source of DC power, a plurality of electrolytic cells in which mercury is used as the cathode, and a plurality of fuel cells in which alkali metal/mercury amalgam is used as the fuel, wherein the electrolytic cells and fuel cells are connected alternately and electrically in series and wherein a shunt is provided from the cathode of each of the electrolytic cells to the anode of the next but one electrolytic cell.

Each cell may derive its sodium amalgam fuel from one of the electrolytic cells to which it is connected preferably from that mercury cell to the cathode of which the fuel cell is connected.

The shunt preferably contains a variable resistance so that the amount of current passing through the shunt can be adjusted.

By a fuel cell is meant one electrode pair, or a number of electrode pairs electrically connected with all the anodes in parallel and all the cathodes in parallel and mounted in the same vessel: one amalgam electrode and one other suitable electrode, e.g. an air electrode, form an electrode pair. In particular, one side of a double sided amalgam electrode is classed as one amalgam electrode and one side of a double-sided air electrode is classed as one air electrode.

A particular advantage of the circuit of the invention is that it is not necessary to use flow interruptors in the amalgam lines connecting each mercury cell to its associated fuel cell. Most circuits that have been proposed for this purpose do require one or two current interruptors for each fuel cell.

The invention is further illustrated with reference to the accompanying circuit diagram in which 1 is a source of DC power, 2 is a mercury cell, 3, 6 and 7 are variable resistances, 4 is a fuel cell and 5 is a conventional decomposer in which the amalgam is reacted with water to produce hydrogen and an alkali metal hydroxide. A current of 60 ka. is used to electrolyze the sodium chloride solution. The current efficiency of the electrolytic cell is 95 percent and that of the fuel cell is 99 percent, so the maximum current obtainable from the fuel cell is 0.95×0.99×60 ka.=56.4 ka. Each fuel cell has electrodes of 1 sq. meter area, which operate at a current density of 100 ma./sq.cm. giving a voltage boost of 1.3 volts. To give a current of 56.4 ka., 56.4 such electrode pairs are required per fuel cell (in practice 58 electrode pairs could be used, the current density would then be less than 100 ma./sq.cm. and the voltage boost would be slightly greater than 1.3 volts).

As stated above each electrolytic cell is operated at a current of 60 ka. It is desired to pass only 56.4 ka. through the fuel cell, so 3.6 ka. is shunted from the electrolytic cell via the variable resistance to the next but one electrolytic cell.

The voltage drop through the electrolytic cell operating at 60 ka. is typically 4.35 volts. Considering a circuit consisting of an electrolytic cell, two fuel cells and a variable resistance, the voltage drop around this circuit is 4.35−2×1.3 volts=1.75 volts. The complete circuit is made up from a number of repeated units one of which is shown on the circuit diagram enclosed within a dotted box.

The theoretical energy saving by the use of fuel cells for each unit circuit is calculated as follows:

Energy required to power the electrolysis cell without a fuel cell = 4.35×60 kw. Using the present invention, the energy delivered by the fuel cell = 1.3×56.4 kw. The energy loss in the variable resistance = 1.75×3.6 kw.

∴ Percent energy recovery $$= \left(\frac{1.3 \times 56.4 - (1.75 \times 3.6)}{4.35 \times 60}\right) \times 100 = 25.6\%$$

The variable resistance 6 associated with the first mercury cell in the complete circuit and the variable resistance 7 associated with the last mercury cell in the circuit have higher energy losses than the other variable resistances. The energy loss in each of these is (4.35−1.3)×3.6 kw. The amalgam leaving the final mercury cell must be decomposed using a conventional decomposer 5 and thus no energy is recoverable from this amalgam. The overall percentage energy recovery for the complete circuit is therefore slightly less than 25.6 percent and for a complete circuit of 50 mercury cells is 25.0 percent. This is calculated as follows: Energy required to power 50 electrolysis cells without fuel cells = 60×4.35×50 kw. = 13,050 kw. Using the present invention for a circuit of 50 electrolysis cells, energy recovery in 48-unit circuits =

48 (56.4×1.3−3.6×1.75) kw. = 3,206.96 kw.

Energy recovery in the first fuel cell = 56.4×1.3 kw. = 73.32 kw.

Energy loss in the first variable resistance = 3.05×3.6 kw. = 10.98 kw.

Energy loss in the final variable resistance = 3.05×3.6 kw. = 10.98 kw.

∴ Overall energy recovery $$= \frac{3206.96 + 73.32 - 10.98 - 10.98}{13,050} \times 100 + 25.0\%$$

I claim:

1. Means for the recovery of electrolytic cell energy which comprises a source of DC power, a plurality of electrolytic cells in which the cathode is mercury and a plurality of fuel cells in which alkali metal/mercury amalgam is the fuel, the electrolytic cells and fuel cells being connected alternately and electrically in series and a shunt between the cathode of each electrolytic cell and the anode of the next but one electrolytic cell, said DC power source being connected across the ends of series.

2. Means according to claim 1 wherein each shunt contains a variable resistor.

3. Means according to claim 1 wherein an amalgam decomposer in which the amalgam is reacted with water to produce hydrogen and an alkali metal hydroxide is connected into an end fuel cell unit utilizing power provided by the fuel cell circuitry to electrolyze sodium chloride solution.

* * * * *